United States Patent [19]
Cutrell et al.

[11] Patent Number: 6,141,777
[45] Date of Patent: Oct. 31, 2000

[54] SYSTEM AND METHOD FOR REPORTING TELECOMMUNICATION SERVICE CONDITIONS

[75] Inventors: George M. Cutrell, Centreville, Va.; James Healy, Brookeville, Md.; William C. Holford; Dennis L. Maino, both of Colorado Springs, Colo.; Michael J. O'Connor, Monument, Colo.; Milton A. Steiner, Colorado Springs, Colo.

[73] Assignee: MCI Communications Corporation, Washington, D.C.

[21] Appl. No.: 08/924,208

[22] Filed: Sep. 5, 1997

Related U.S. Application Data

[63] Continuation of application No. 08/674,639, Jun. 28, 1996, abandoned.

[51] Int. Cl.[7] .................................................. H02H 3/05
[52] U.S. Cl. .................. 714/47; 395/182.02; 395/184.1; 395/185.1; 395/185.2; 395/183.15; 395/200.53; 395/200.54; 379/1; 379/10; 379/13; 379/14; 379/26; 379/27; 379/32; 379/33; 379/34
[58] Field of Search ........................ 395/182.02, 184.01, 395/185.01, 185.02, 183.15, 200.53, 200.54; 379/1, 10, 13, 14, 26, 27, 32, 33, 34

[56] References Cited

U.S. PATENT DOCUMENTS

| | | | |
|---|---|---|---|
| 4,464,543 | 8/1984 | Kline et al. ............................ | 379/104 |
| 4,972,453 | 11/1990 | Daniel, III et al. ........................ | 379/10 |
| 5,049,873 | 9/1991 | Robins et al. ............................. | 379/14 |
| 5,163,151 | 11/1992 | Bronikowski et al. .............. | 395/185.1 |
| 5,241,580 | 8/1993 | Babson, III ................................. | 379/15 |
| 5,251,302 | 10/1993 | Weigl ....................................... | 395/250 |
| 5,299,257 | 3/1994 | Fuller et al. ................................. | 379/1 |
| 5,333,183 | 7/1994 | Herbert .................................... | 379/112 |
| 5,425,087 | 6/1995 | Gerber et al. ............................ | 379/134 |
| 5,483,631 | 1/1996 | Nagai et al. .............................. | 395/155 |
| 5,488,648 | 1/1996 | Womble .................................... | 379/13 |
| 5,488,715 | 1/1996 | Wainright ........................... | 395/182.02 |
| 5,551,025 | 8/1996 | O'Reilly et al. ......................... | 395/600 |
| 5,640,505 | 6/1997 | Hearn et al. ......................... | 395/182.02 |
| 5,796,723 | 8/1998 | Bencheck et al. ....................... | 370/252 |
| 5,797,096 | 8/1998 | Lupien et al. .......................... | 455/433 |
| 5,838,768 | 11/1998 | Sumar et al. .............................. | 379/89 |

FOREIGN PATENT DOCUMENTS

| | | | | |
|---|---|---|---|---|
| 3122767 | 5/1991 | Japan | ............................... | G06F 15/40 |
| 0417442 | 1/1992 | Japan | ............................. | H04L 12/24 |

*Primary Examiner*—Ly V. Hua

[57] ABSTRACT

A system and method for reporting, directly to a customer, conditions of telecommunications services to which the customer subscribes. The system includes a server for collecting fault information from the telecommunications network management system and a customer workstation for viewing the information. The customer can use the workstation to define a view of the data he wishes to receive. The server builds reports using the view, and provides the reports to the customer.

15 Claims, 4 Drawing Sheets ary, MCI's TANDEM® and SENTRY® forwarding facilities provide fault information for voice network events. Various leased services are monitored for events including, for example, 800 service dedicated circuit alarms, 900 service dedicated circuit alarms, Prism® dedicated circuit alarms, Vision® dedicated circuit alarms, VNET (MCI virtual private network) service dedicated circuit alarms, ISDN (Integrated Services Digital Network) service dedicated circuit alarms, DDS/DS0 (MCI dedicated data service) circuit alarms and TDS (MCI terrestrial data service) 1.5 and 45 circuit alarms.

SYSTEM AND METHOD FOR REPORTING TELECOMMUNICATION SERVICE CONDITIONS

This application is a continuation of application Ser. No. 08/674,639, filed Jun. 28, 1996, now abandoned.

BACKGROUND OF THE INVENTION

1. Field of the Invention

The present invention relates to systems for monitoring call conditions on a telecommunications network. Specifically, a system is described for reporting network events, including alarms and other network conditions affecting a customer's telecommunication service, directly to a customer.

2. Related Art

Major customers of telecommunications services have in the past relied upon their telecommunications carrier to identify network problems and take corrective measures. The common carrier conducts a continuous fault monitoring process throughout its network to identify, locate and correct conditions which adversely affect voice and data lines.

Common carriers generally make fault information (information regarding network events) available. For example, fault information for data network events is presently available from the DIGINET® forwarding facility of the MCI Corporation. Similarly, MCI's TANDEM® and SENTRY® forwarding facilities provide fault information for voice network events. Various leased services are monitored for events including, for example, 800 service dedicated circuit alarms, 900 service dedicated circuit alarms, Prism® dedicated circuit alarms, Vision® dedicated circuit alarms, VNET (MCI virtual private network) service dedicated circuit alarms, ISDN (Integrated Services Digital Network) service dedicated circuit alarms, DDS/DS0 (MCI dedicated data service) circuit alarms and TDS (MCI terrestrial data service) 1.5 and 45 circuit alarms.

Customers of leased facilities can take corrective measures to mitigate faults that occur over the leased services. For example, if a particular trunk or trunk group becomes unusable due to a reported fault, the customer can route calls to other facilities until the affected lines are cleared of their faults. If the customer detects the problem before the carrier, the customer can also send a service request to the carrier.

However, customers cannot react to mitigate problems associated with network alarms and faults unless they are promptly informed of these events. The delivery of information relating to these service problems to the department or location within a customer's organization that is responsible for managing their leased facilities would permit the customer to analyze various fault conditions and traffic patterns within their portion of the network and manage these facilities more economically.

Providing individual telecommunications management information to telecommunications customers is complicated by the fact that different customers lease different types of services. Effective fault management must be configured to match the particular services that individual customers lease, precluding a "one size fits all" solution to network management.

What is needed is a way to provide to individual customers of leased telecommunications services information pertaining to facility performance.

What is further needed is a way to provide real time-custom event views specific to the services leased by a telecommunications customer.

SUMMARY OF THE INVENTION

The present invention is a system and method for reporting selected telecommunication service conditions to individual customers. A fault management system is provided in accordance with the invention to customers of telecommunications services. A workstation at the customer's location is linked to a fault server of the telecommunications carrier. The fault server is in turn connected to the telecommunications carrier's network management system which collects real time data relating to faults and traffic conditions occurring on the carrier's telecommunications network.

The fault server of the network management system is linked to an open server which is configured to receive events, such as alarms and traffic conditions, which describe network conditions. As each customer typically subscribes to a different package of services, the workstation is capable of configuring the server to report only events which are germane to the particular package of leased services.

The workstation at the customer's location receives, from the server, event information relating to the services to which that customer subscribes. An event queue within the workstation stores each event as it is reported from the server, including the date and time of the event, the nature of the event, location of the event within the network, etc. A graphical user interface at the workstation permits the data from the event queue to be displayed to the user.

The workstation and server interact. When an event is received by the workstation from the server, and the user acknowledges the event, the workstation forwards an acknowledgment to the server indicating that the event has been reported, and the event is displayed as a new event by the workstation.

One advantage of the present invention is that it permits a customer to receive fault information regarding the telecommunications services to which he subscribes.

Another advantage of the present invention is that it permits a customer to define criteria for reporting telecommunications service conditions.

Further features and advantages of the present invention as well as the structure and operation of various embodiments of the present invention are described in detail below with reference to the accompanying drawings. In the drawings, like reference numbers indicate identical or functionally similar elements. Additionally, the left-most digits of a reference number identify the drawing in which the reference number first appears.

BRIEF DESCRIPTION OF THE FIGURES

The present invention will be described with reference to the accompanying drawings, wherein.

DETAILED DESCRIPTION OF THE PREFERRED EMBODIMENTS

Figure 1:
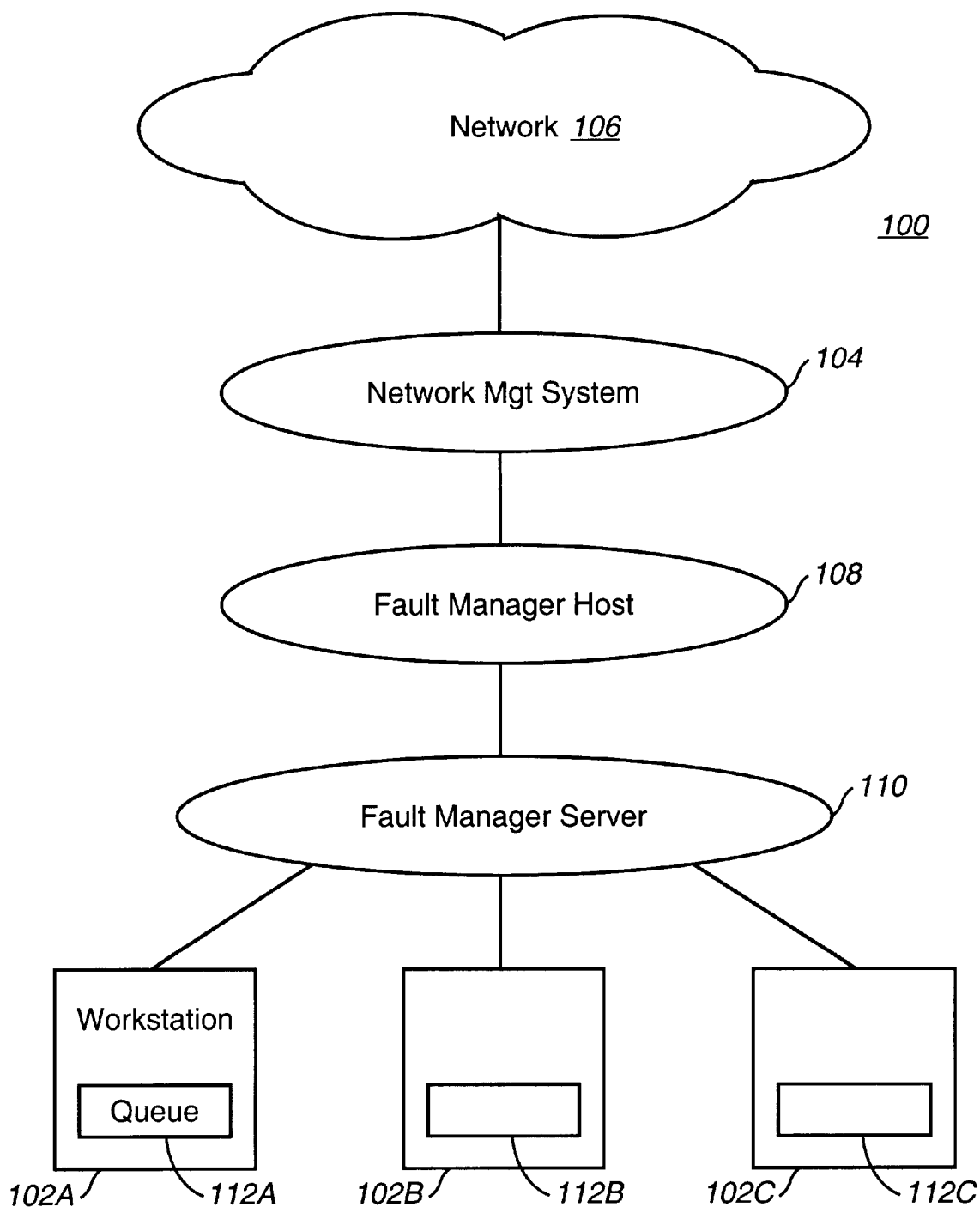
FIG. 1 depicts an example fault management system for reporting telecommunication service conditions.

FIG. 1 depicts an example fault management system 100 for reporting telecommunication service conditions. Fault management system 100 includes a plurality of fault manager workstations 102, which are linked to a network management system 104. Network management system 104 collects network events, including alarms and traffic densities from a common carrier network 106. All of the events collected by network management system 104 are reported to a fault manager host 108. The common carrier keeps track of the performance and network faults for network 106 through a myriad of network management systems 104 and routes the information real-time to fault manager host 108. In order to provide information regarding a particular customer's leased services, events collected by fault manager host 108 are downloaded to fault manager server 110.

Fault manager server 110 accumulates in real time a database of events pertinent to each customer's leased services. The accumulated data is viewable on one or more fault manager workstations 102. Because individual customers may subscribe to various different services which may experience different events, fault manager server 110 must not only collect different sets of data on a real-time basis from fault manager host 108, but a fault manager workstation 102 must present the data in a format relevant to the particular services to which the customer subscribes. This data is organized for display to the user of workstation 102 in an event queue 112.

Figure 2:
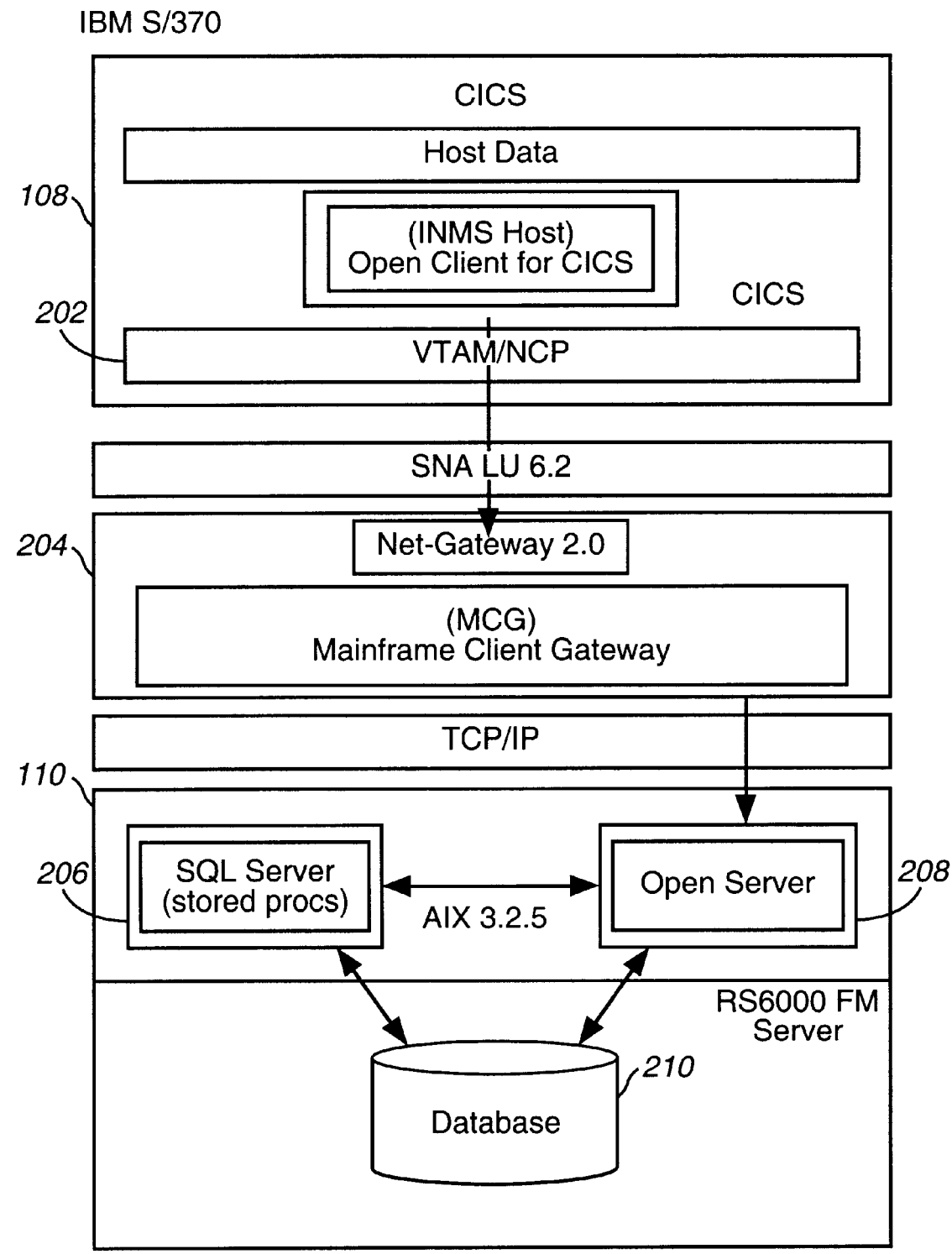
FIG. 2 depicts the architecture of a preferred embodiment of a fault manager host and fault manager server.

In a preferred embodiment of the present invention, fault manager host 108 is an Integrated Network Management System (INMS) host implemented as an IBM S/370 mainframe and fault manager server 110 is implemented as an IBM RS6000 computer; the architecture of this embodiment is depicted in FIG. 2. The present invention may be implemented in other ways, as would be apparent to one skilled in the relevant art.

Referring to FIG. 2, INMS host 108 operates in an IBM Customer Information Control System (CICS) environment and includes an IBM virtual telecommunications access method/network control program (VTAM/NCP) interface 202 for making an IBM Systems Network Architecture/ Logical Unit interface version 6.2 (SNA LU6.2) connection to a mainframe client gateway (MCG) 204 of INMS host 108. MCG 204 in turn makes a Transport Control Protocol/ Internet Protocol (TCP/IP) connection to IBM RS6000 fault manager server 110, which operates under the IBM Advanced Interactive Executive (AIX) 3.2.5 operating system.

Server 110 comprises two servers: a Structure Query Language (SQL) server 206 and an open server 208. Open server 208 receives events from INMS host 108 and stores them on a database 210 stored on server 110. SQL server 206 is a database engine providing access to and managing database 210. In a preferred embodiment, database 210 is a Sybase® database and SQL server 206 is a Sybase® SQL server.

Database 210 compiles information that is sent on a regular basis by INMS host 108. The data stored in the SQL server can be queried at will by a workstation 102 for analysis. Database 210 is a relational database using SQL server 206 as the database management system (DBMS). In a preferred embodiment, database 210 comprises three databases. The first database includes information relevant to other network management applications (for example, MCI ServiceView®), such as facilities and circuit prefixes, and a customer mapping table for all customers subscribing to the fault manager service.

The second database is the customer database. It contains specific event information such as alarms, reporting and user information. It also tracks the users who log on from the various fault manager workstations 210, including the user's log-on passwords, access security, and the various alarm descriptions and their status as reported by network management system 104.

The third database contains statistics relating to the various facilities monitored by network management system 104. In a preferred embodiment, these statistics are compiled and updated on a regular basis, by MCI Extended Super Frame Monitoring Units.

Database 210 includes a number of tables of data which are accessed by fault manager workstations 102 to event displays, including alarm displays, alarm reports, facilities cross-references and event log displays. User access to database 210 is by way of password security handled by SQL server 206; levels of security can also be provided to permit tiers of access to different levels of information within database 210, as would be apparent to one skilled in the relevant art.

The data within database 210 is organized in views. For example, an alarm view provides an alarm description, an alarm severity representing the degree of consequence for the alarm, and selected conditions associated with the alarm.

The interface between INMS host 108 and server 110 is one-way, from the INMS host only. In this scenario, the INMS host 108 is a client, issuing calls for stored procedures to SQL server 206 via MCG 204 when there is an event to report.

When MCG 204 receives a request from INMS host 108, it accepts an LU6.2 conversation and creates a local-area-network-based connection to SQL server 206. The request is then forwarded to SQL server 206, which updates database 210 with the information sent by INMS host 108.

Fault manager workstations 102 access database 210 via SQL server 206. In a preferred embodiment of the present invention, this access takes place over a dial-up modem connection. Other methods of access can be employed without departing from the spirit and scope of the present invention, as would be apparent to one skilled in the relevant art.

Figure 3:
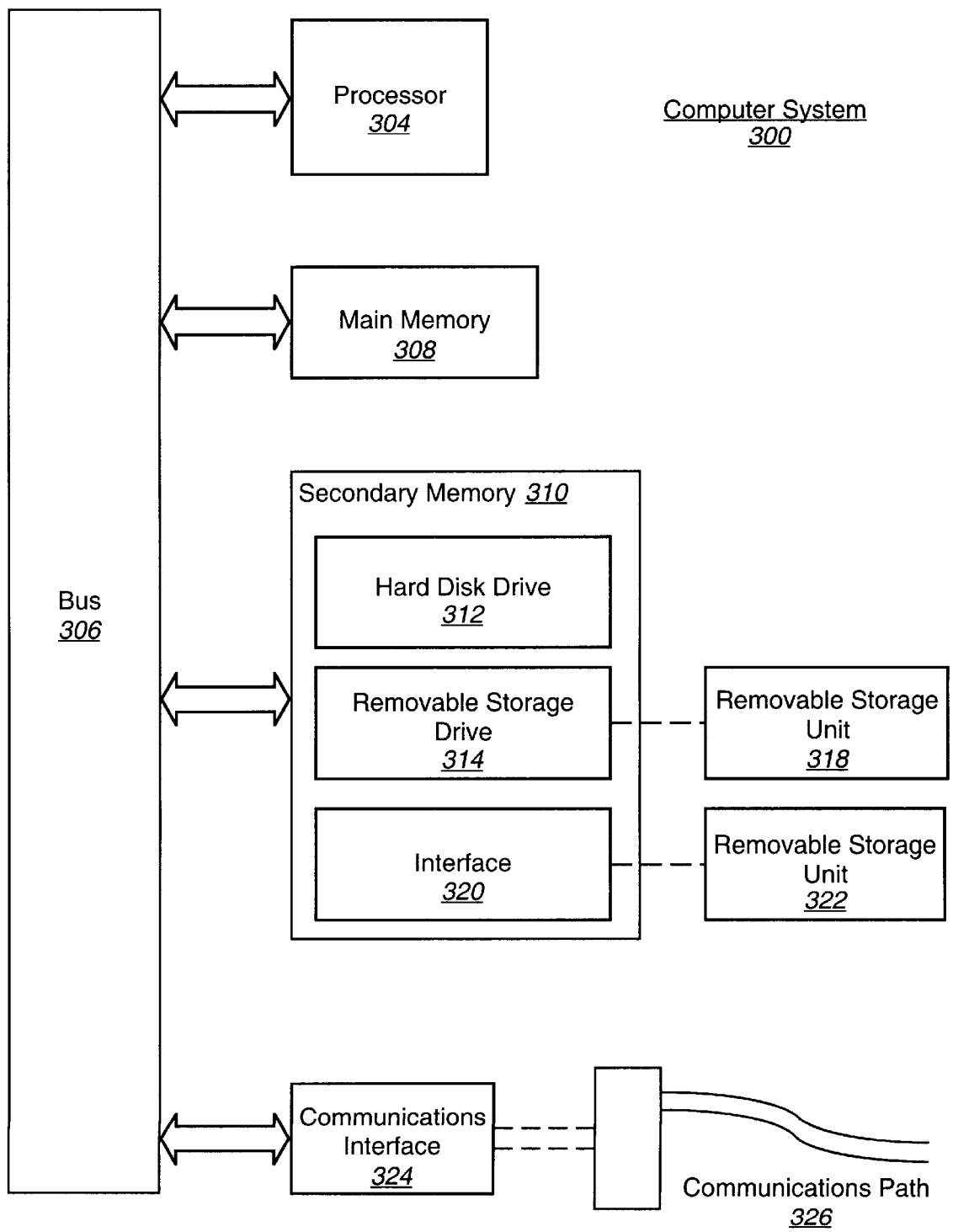
FIG. 3 is a block diagram depicting an example workstation.

FIG. 3 is a block diagram depicting an example workstation 102. Workstation 102 includes one or more processors, such as processor 304. The processor 304 is connected to a conununications bus 306. Various software embodiments are described in terms of this example workstation 102. After reading this description, it will be apparent to a person skilled in the relevant art how to implement the invention using other computer systems and/or computer architectures.

Workstation 102 also includes a main memory 308, preferably random access memory (RAM), and can also include a secondary memory 310. The secondary memory 310 can include, for example, a hard disk drive 312 and/or a removable storage drive 314, representing a floppy disk drive, a magnetic tape drive, an optical disk drive, etc. Removable storage drive 314 reads from and/or writes to a removable storage unit 318 in a well known manner. Removable storage unit 318 represents a floppy disk, magnetic tape, optical disk, etc., which is read by and written to by removable storage drive 314. As will be appreciated, the removable storage unit 318 includes a computer usable storage medium having stored therein computer software and/or data.

In alternative embodiments, secondary memory 310 may include other similar means for allowing computer programs or other instructions to be loaded into workstation 102. Such means can include, for example, a removable storage unit 322 and an interface 320. Examples can include a program cartridge and cartridge interface (such as that found in video game devices), a removable memory chip (such as an EPROM, or PROM) and associated socket, and other removable storage units 322 and interfaces 320 which allow software and data to be transferred from the removable storage unit 322 to workstation 102.

Workstation 102 can also include a communications interface 324. Communications interface 324 allows software and data to be transferred between workstation 102 and external devices through communications path 326. Examples of communications interface 324 can include a modem, a network interface (such as an Ethernet card), a communications port, etc. Software and data transferred through communications interface 324 are in the form of signals which can be electronic, electromagnetic, optical or other signals capable of being received by communications interface 324 through communications path 326.

Workstation 102 is described in these terms for convenience only. It is not intended that the present invention be limited to application in this example environment. In fact, after reading the following description, it will become apparent to a person skilled in the relevant art how to implement the invention in alternative environments.

Figure 4:
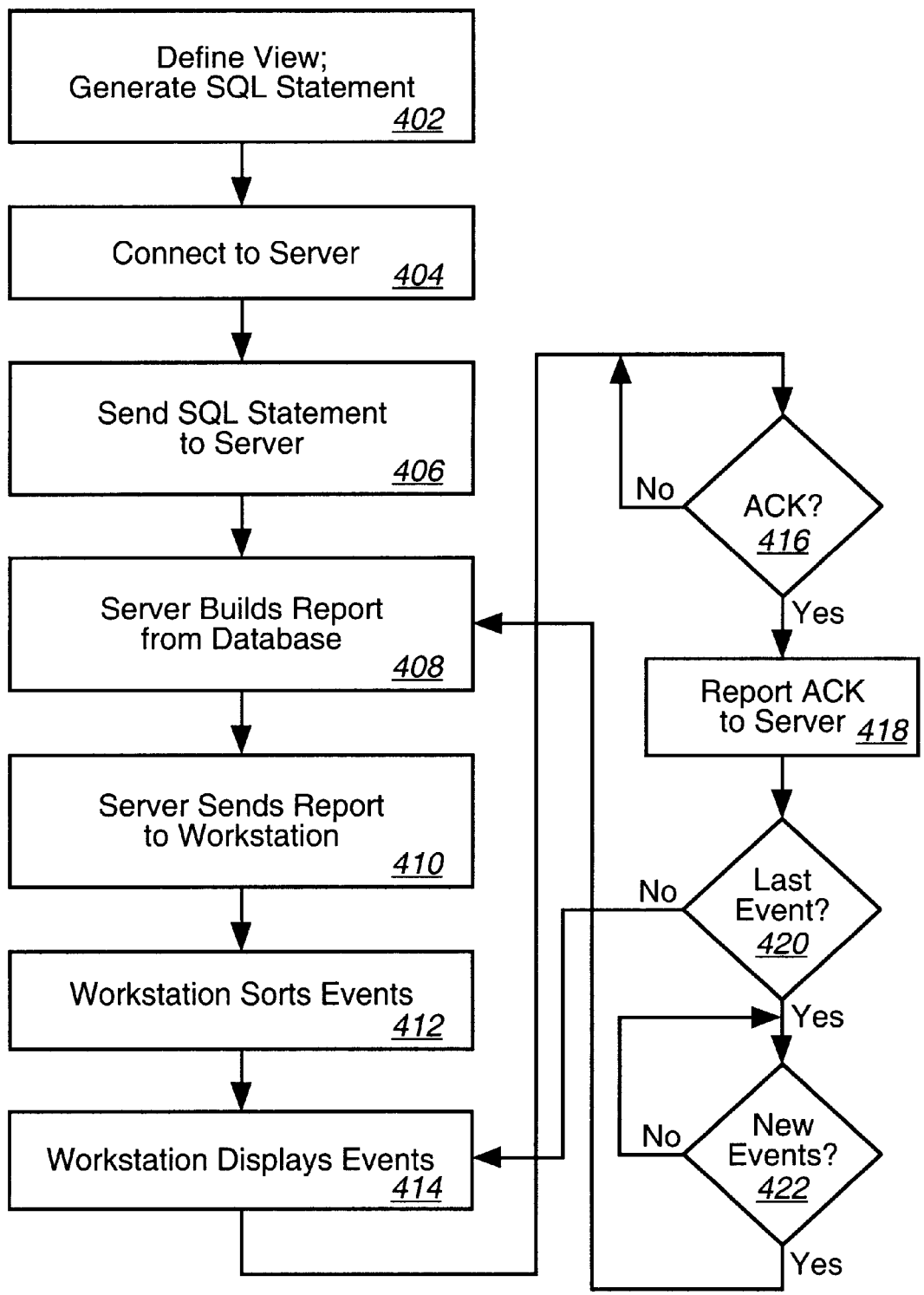
FIG. 4 is a flowchart depicting the operation of a preferred embodiment of the present invention.

FIG. 4 is a flowchart depicting the operation of a preferred embodiment of the present invention. Typically, a customer subscribes to several particular leased services. In order to limit data collection to data germane to those particular services, the user must specify the data to be collected. The user does this by defining an event view of data to be collected, as shown in a step 402. The event view specifies, for example, which services are to be monitored and what data is to be collected and reported for those services. For example, the event view may include the following items:

Severity: Critical, Major, Minor, Informational, No Alert.

Service Types (MCI): 800, 900, TDS 1.5, TDS 45, VNET, Prism®, Vision®, ISDN, SW56 and DDS/DD0

Corporate Identifiers: A list of corporate identifiers related to the customer's enterprise and for which the user is authorized access.

Facilities: All elements of a physical telephone plant required to provide a service and to which the user is authorized access (for example, trunk groups and circuits).

Data Elements: The user can configure a customized event view by selecting the data fields to be displayed.

Date and Time Elements: The user can configure a customized event view by selecting the date and time period for the custom event view.

Sort Order: The user can configure a customized event view by selecting, for example, the data fields on which the data to be displayed is sorted.

Once the event view has been defined, workstation 102 generates an SQL statement which will command server 110 to create the event view from data stored in database 210. In a preferred embodiment, the SQL statement is constructed such that each element/field is joined by an "AND" and values within each element/field are joined by an "OR." Thus, a partial SQL statement would be similar to:

Severity=critical OR severity=Major

AND

ServiceType=VNET

AND

CORP ID=123434 OR CORP ID=32432423

AND . . . etc.

Once the SQL statement has been generated, workstation 102 connects to fault manager server 110, as shown in a step 404. In a preferred embodiment, the connection is made via a dial-up modem connection. Other connection methods and protocols can be employed without departing from the spirit and scope of the present invention, as would be apparent to one skilled in the relevant art.

Once the physical connection has been made between workstation 102 and server 110, the user enters a valid name and password. Server 110 then checks the credentials of the user before starting a session with workstation 102. This is accomplished via a connection between open server 208 and an external server (not shown) that contains user account information (for example, user name and password).

Once the session has been established, the SQL statement created in step 402 is forwarded to SQL server 206. The SQL statement identifies to SQL server 206 the particular stored procedure to be activated to obtain event view specified by the SQL statement. SQL server 206 then executes the stored procedure and builds a report of event data specified by the event view, as shown in a step 408.

Once the event report is built, it is sent to workstation 102. Events which are reported from server 110 to workstation 102 are loaded in event queue 112. The events in event queue 112 are sorted by sort criteria entered by the user when defining the event view, as shown in a step 412. In a preferred embodiment, the primary sort criterium is severity. The sorted events are displayed to the user on the workstation monitor in a step 414. Each event displayed is accompanied by an acknowledgment field for the user to indicate his acknowledgment of the event; for example, the user can acknowledge an event by entering an asterisk in the associated acknowledgment field. When the user acknowledges an event, as indicated by the "Y" branch from step 416, workstation 102 reports the acknowledgment to server 110, as shown in a step 418. When the user has acknowledged the last event in event queue 112, as indicated by the "Y" branch from step 420, event processing ends. At this point, the user may either retain the session or close it.

If the session remains open, server 110 will report new events defined by the event view as they are received by server 110. When server 110 receives a new event, as indicated by the "Y" branch from step 422, processing resumes at step 408, as shown in FIG. 4.

Thus, in accordance with the event view defined by the user and communicated to fault manager server 110, reports of events identified in the event view will be continuously forwarded to workstation 102, and made available in event queue 112 for display to the user in order of the severity of the event.

What is claimed is:

1. A fault manager system for reporting events, said events describing conditions of telecommunication services including service types and facilities, comprising:

a server for receiving the events from a fault manager host and building an event report based on said events and an event view;

said server configured to build said report for a customer using only events related to a package of services leased by said customer; and at least one workstation, coupled to said server, said workstation comprising:

means for defining said event view, said event view specifying events to be reported to a user;

means for sending said event view to said server;

means for receiving said event view to said server; and means for displaying events in said event report on a monitor.

2. The system of claim 1, wherein said workstation further comprises:

means for storing each received event in an event queue.

3. The system of claim 2, wherein said workstation further comprises:

means for sorting said events in said event queue in accordance with said event view.

4. The system of claim 1, wherein said workstation further comprises:

means for sending an acknowledgment to said server after an event is acknowledged by a user.

5. The system of claim 4, wherein said workstation further comprises:

means for displaying each of said events with a field for a user to acknowledge each of said events.

6. In a fault manager system for reporting events, said events describing conditions of telecommunication services including service types and facilities, said system including a server for receiving only events related to a package of services leased by a customer from a fault manager host and building an event report for said customer based on said events and an event view and at least one workstation, coupled to said server, a computer program product comprising a computer usable medium having computer readable program code means embodied in said medium for causing an application program to execute on said workstation, said computer readable program code means comprising:

a computer readable first program code means for causing said workstation to define said event view, said event view specifying events to be reported to a user;

a computer readable second program code means for causing said workstation to send said event view to said server;

a computer readable third program code means for causing said workstation to receive said event report from said server; and a computer readable fourth program code means for causing said workstation to display said events in said event report on a monitor.

7. The system of claim 6, wherein said computer readable program code means further comprises:

a computer readable fifth program code means for causing said workstation to store each received event in an event queue.

8. The system of claim 7, wherein said computer readable program code means further comprises:

a computer readable sixth program code means for causing said workstation to sort said events in said event queue in accordance with said event view.

9. The system of claim 6, wherein said computer readable program code means further comprises:

a computer readable further program code means for causing said workstation to send an acknowledgment to said server after an event is acknowledged by a user.

10. The system of claim 9, wherein said computer readable program code means further comprises:

a computer readable further program code means for causing said workstation to display each of said events with a field for a user to acknowledge each of said events.

11. In a fault manager system for reporting events, said events describing conditions of telecommunication services including service types and facilities, said system including a server for receiving events, related to a package of services leased by a customer, from a fault manager host and building an event report for said customer based on said events and an event view and at least one workstation, coupled to said server, a method for reporting conditions of telecommunication services comprising the steps of:

(a) defining a view of events to be reported by the server to the workstation;

(b) sending said view to the server;

(c) at the server, building a report of events defined by said view;

(d) sending said report to said workstation; and (e) displaying said events to a monitor.

12. The method of claim 11, further comprising the step of:

(f) storing each received event in an event queue.

13. The method of claim 12, further comprising the step of:

(g) sorting said events in said event queue in accordance with said view.

14. The method of claim 11, further comprising the step of:

(h) sending an acknowledgment to said server after an event is acknowledged by a user.

15. The system of claim 14, further comprising the step of:

(i) displaying each of said events with a field for a user to acknowledge each of said events.

* * * * *